United States Patent
Hiim et al.

(10) Patent No.: US 7,522,577 B2
(45) Date of Patent: Apr. 21, 2009

(54) AUTOMATIC CALL ROUTING

(75) Inventors: Lars Hiim, Oslo (NO); Thies Schrader, Haslum (NO)

(73) Assignee: Tandberg Telecom AS, Lysaker (NO)

( * ) Notice: Subject to any disclaimer, the term of this patent is extended or adjusted under 35 U.S.C. 154(b) by 876 days.

(21) Appl. No.: 10/876,114

(22) Filed: Jun. 25, 2004

(65) Prior Publication Data
US 2005/0025074 A1 Feb. 3, 2005

(30) Foreign Application Priority Data
Jul. 7, 2003 (NO) .................................. 20033107

(51) Int. Cl.
*H04L 12/28* (2006.01)
(52) U.S. Cl. ................... 370/351; 370/260; 370/352; 370/355; 707/1; 707/10
(58) Field of Classification Search ................ 370/352, 370/356, 156, 353, 351; 709/200; 707/10
See application file for complete search history.

(56) References Cited

U.S. PATENT DOCUMENTS

| | | | |
|---|---|---|---|
| 5,280,583 A | 1/1994 | Nakayama et al. | |
| 5,642,156 A | 6/1997 | Saiki | |
| 5,812,652 A | 9/1998 | Jodoin et al. | |
| 5,867,494 A * | 2/1999 | Krishnaswamy et al. | 370/352 |
| 5,867,495 A * | 2/1999 | Elliott et al. | 370/352 |
| 5,999,966 A | 12/1999 | McDougall et al. | |
| 6,100,918 A | 8/2000 | Lu | |
| 6,175,564 B1 | 1/2001 | Miloslavsky et al. | |
| 6,292,478 B1 * | 9/2001 | Farris | 370/352 |
| 6,324,169 B1 * | 11/2001 | Roy | 370/260 |
| 6,584,071 B1 | 6/2003 | Kodialam et al. | |
| 6,584,093 B1 * | 6/2003 | Salama et al. | 370/351 |
| 6,707,797 B1 * | 3/2004 | Gardell et al. | 370/260 |
| 7,215,663 B1 * | 5/2007 | Radulovic | 370/356 |
| 2003/0028535 A1 * | 2/2003 | Sheldon et al. | 707/10 |
| 2004/0001579 A1 * | 1/2004 | Feinberg et al. | 379/156 |
| 2004/0022237 A1 * | 2/2004 | Elliott et al. | 370/356 |
| 2004/0223500 A1 * | 11/2004 | Sanderson et al. | 370/395.53 |

FOREIGN PATENT DOCUMENTS

| | | |
|---|---|---|
| JP | 2001-144854 A | 5/2001 |
| JP | 2002-185523 A | 6/2002 |

OTHER PUBLICATIONS

Ahmed et al., "An Architecture for Providing Range Extension by Deploying Mobile Gateways in Ad Hoc Networks," Personal Indoor and Mobile Radio Communications, The 13th IEEE International Symposium, Sep. 15-18, 2002, Piscataway, NJ., vol. 4, pp. 1660-1664.

* cited by examiner

*Primary Examiner*—Fan Tsang
*Assistant Examiner*—Simon King
(74) *Attorney, Agent, or Firm*—Birch, Stewart, Kolasch & Birch, LLP

(57) ABSTRACT

The present invention relates generally to conferencing network systems, and more specifically to a method and a device for establishing a route between a first and a second conference network device in a conference network.

17 Claims, 2 Drawing Sheets

AUTOMATIC CALL ROUTING

This Non-provisional application claims priority under 35 U.S.C. § 119(a) on Patent Application No(s). 20033107 filed in Norway on Jul. 7, 2003, the entire contents of which are hereby incorporated by reference.

FIELD OF THE INVENTION

The present invention relates generally to conferencing network systems, and more specifically to a method and a device for establishing routes between conference network devices in a conference network.

BACKGROUND OF THE INVENTION—PRIOR ART

To set up a videoconference meeting may be complex. Especially if a user has to consider resources, bandwidth settings, protocols, ISDN dial rules (area code rules, prefixes, correct ISDN call strings etc.), IP dial rules, gatekeepers, gateways etc. to make the conference go through with high quality. It may be especially difficult to take advantage of gateway functionality when setting up a call. The inventive method described herein makes it easy to take advantage of gateway functionality.

The method also avoids the problem of having to manually setup a multi-MCU (Multi-point Control Unit) distributed conference call, and it reduces the problem of time lag and of using unnecessary resources. Time lag appears when end points (Video/Audio Terminal/Telephone or Gateway), located on different slave MCUs, communicate with each other. Unnecessary resources may be used when there are in fact enough resources to hold the entire conference using say 2 MCUs, but instead the conference systems are distributed over 3 or more MCUs. This is grossly inefficient and increases the problem of time lag.

The invention includes a routing solution that automatically sets up videoconferences. A user does not have to have any knowledge of the network configuration, gateways, and gatekeepers etc, to set up a call. This will be done automatically. The user simply chooses the systems he/she wants to use, preferably through a user interface such as a web interface, and the routing solution takes care of setting up the conference. The automatic call routing will decide whether or not to use a direct IP call, direct ISDN call, or to route a call through gateways, based on ISDN costs, quality calculations and bandwidth resources on the end points.

This document will describe a new and inventive routing and how gateways are automatically used if they are needed in a call.

There are several publications describing different technical aspects of connecting conferencing devices.

U.S. Pat. No. 6,175,564 describes an apparatus and a method for managing multiple Internet protocol capable call centres. The main focus is to route Internet Protocol Network Telephony (INPT) calls to agent stations by using dedicated computers adapted to receive INPT calls. A router coupled to each of the computers at the call centres is adapted to execute routing rules to select agent stations for transferring calls received at the routing points.

U.S. Pat. No. 6,100,918 describes a video system and method for optimizing videoconferencing where only one way transmission of video is required.

U.S. Pat. No. 5,280,583 describes a system and method for performing interlocution at a plurality of terminals connected to an ISDN communication network. A program is operated by a user through a user interface on a work station. The work station will establish a control communication route among a plurality of stations in accordance with operation by users controlling the program.

U.S. Pat. No. 5,999,966 describes a system and method for controlling network-directed video conferencing switching.

U.S. Pat. No. 5,642,156 describes system for video-conference network managing having function for managing each site and each schedule concerning video conference.

U.S. Pat. No. 5,812,652 describes a centralized management and allocation of bridges in a telecommunications network for a meet-me conferencing service.

The cited publications above describe more or less relevant aspects of setting up a conference with regard to the present invention. The latest three publications are included as general background art in the video conferencing technology.

OBJECTS AND SUMMARY OF THE INVENTION

An object of the present invention is to provide a method and a device for automatically establishing routes between conference network devices in a video conference network. This includes automatic determination and routing of the best route in complex mixed networks (e.g. H320 and H323).

Network devices can be any element used in the call setup of two or more video conference devices, i.e. MCU, Gateway (connecting different networks together, e.g. IP and ISDN), Gatekeeper (act as the central control point and provides call control services to registered end points) and end points (EP) etc.

The objects stated above, is achieved by means of a method and a device as set forth in the appended set of claims.

DETAILED DESCRIPTION OF A PREFERRED EMBODIMENT

As mentioned, the object of this invention is to establish a route between two or several conference network devices in a conference network comprising a plurality of conference network devices and at least one gatekeeper. The conference network may comprise a circuit switched sub-network such as an ISDN sub-network and a packet switched sub-network such as an IP sub-network. At least one conference network device may be a gateway operatively included in an MCU, and at least one conference network device may be an MCU operatively included in an end point.

The method can be performed by operating a user interface on a user terminal operatively connected to the network, i.e. MS Internet Explorer©.

The inventive method comprises several steps.

The first step is to collect registration data about the conference network devices selected from a group consisting of an end point, an MCU, and a gateway. In a preferred embodiment, the different registration data for the network devices are provided from intermediate database storage. By keeping information on each video conference system updated in a database, establishing a route between network devices will be faster that collecting this information from each device.

The second step is to generate a set of possible routes, using said registration data.

This set of routes is, in a next step, reduced to set of possible routes through the network, where the routes are reduced based on a weighting function, based on a set of cost functions. The cost function may involve at least one parameter selected from a group consisting of network type parameters, delay parameters, bandwidth parameters, and cost rate parameters.

An important parameter is the delay or time lag parameter (defined earlier). Therefore a route that involves a gateway will be excluded if the route can be established without the participation of the gateway. This may be done if conference network devices are registered on the same gatekeeper.

If two or more conference network devices are enabled for IP communication with the conference network, a direct IP route will be included in said reduced set of possible routes.

On the other hand, if two or more conference network devices are enabled for ISDN communication with the conference network, a direct ISDN route will be included in said reduced set of possible routes.

In the case where one or more network devices are enabled for IP communication with the conference network, and one or more network devices are enabled for ISDN communication, a route involving at least one gateway between the ISDN sub-network and IP sub-network is included in said network.

The next step is to select one or more routes from the set of possible routes generated in the weighting step above. The route(s) selected will be the route(s) with the lowest total cost.

The method further comprises the steps of presenting said selected route to a user, and receiving a confirmation from the user before establishing said selected route upon receipt of the confirmation from the user.

The invention will be further described by reference to the figures, where:

As mentioned, the principal idea of the invention is to make it very simple to create videoconferences through a user interface such as a web interface, and use gateways in the call if this is adequate. A user simply selects the videoconference units he/she wants in a conference. The user does not have to worry about conference setup. This makes it very simple to set up a videoconference taking advantage of gateway functionality.

By way of examples, it will in the following be described how the inventive method may be implemented in a system to route a call by using gateways.

The first example describes a call going from a-videoconference system using ISDN, through a gateway and into an IF only system (ISDN-Gateway-IP calls).

The second example describes a call going from an IP only system, through a gateway to ISDN, through another gateway and into another IP only system (IP-Gateway-ISDN-Gateway-IP).

ISDN-Gateway-IP calls.

Figure 1:
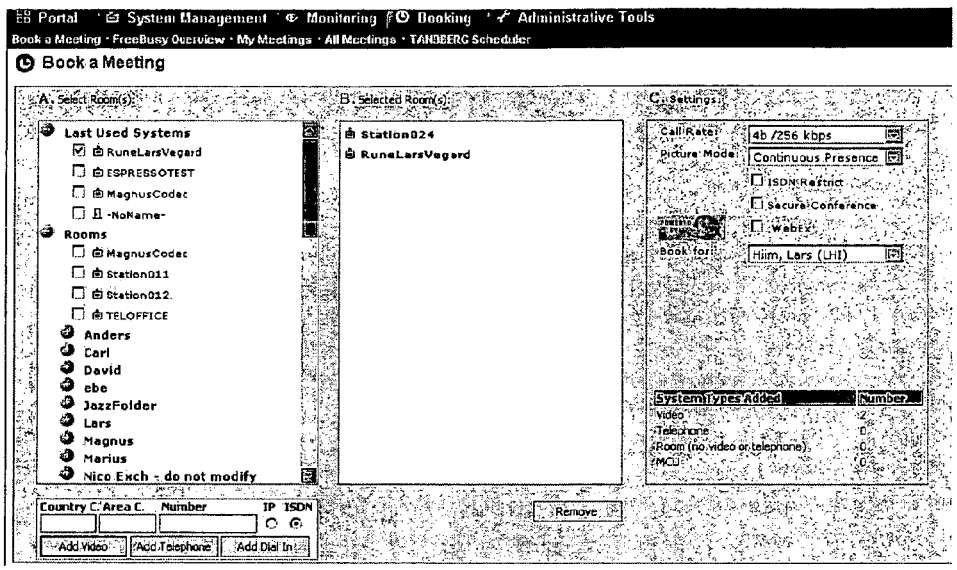
FIG. 1 shows an example of a user interface where the user can add videoconference systems ('rooms') to a conference.

FIG. 1 shows the graphical user interface (GUI) for making a videoconference meeting in the Tandberg Meeting Scheduler (TMS), which implement the above described inventive method for automatic call routing. This first example shows that two video conference systems are chosen, system "Station24" and system "RuneLarsVegard".

Figure 2:
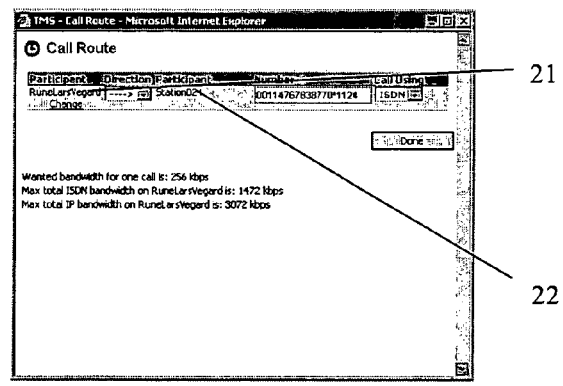
FIG. 2 shows the user interface for setting up an ISDN Gateway-IP call automatically according to the inventive method.

As indicated in FIG. 2, RuneLarsVegard is located in a TMS location called "DallasOffice", which is in the USA. "Station24" has TMS location "LysakerOffice", which is in Norway. "RuneLarsVegard" has ISDN bandwidth; "Station24" is an IP only system. In TMS location "LysakerOffice", it is also registered an in-house gateway and a gatekeeper.

There are several aspects to be taken into account when setting up this call between system "RuneLarsVegard" and "Station24". These include which system should call out, which protocol should be used, how the dial string will look like etc. TMS routing will set all this automatically. In this example TMS routing decides to initiate the call from system "RuneLarsVegard" with location "DallasOffice".

FIG. 2 shows the automatically made call route. TMS routing decides to call from system "RuneLarsVegard" 21, which is a system located in "DallasOffice", USA by using ISDN with a bandwidth of max 1472 kbps to the gateway in "LysakerOffice". System "Station24" 22 has location "LysakerOffice" (Norway). This system has no ISDN bandwidth. There is a gateway at the "LysakerOffice" location. TMS routing adds the extension number of "Station24" at the end of the call string The number is automatically routed to be 00114767838770*1124. This call string is based on TMS location info on "DallasOffice" and "LysakerOffice".

TMS decides not to call IP directly between the two videoconference systems because then it had to rely on the public IP network between Norway and USA, which may give poor quality for the videoconference call. ISDN is used from USA to the gateway in the "LysakerOffice" location, because ISDN gives stable bandwidth quality.

TMS checks the gatekeeper status of the gateway and system "Station24" to make sure that the E164 alias extension number call from the gateway to "Station24" will go through. If the gateway had incorrect gatekeeper status, TMS routing will try to use another gateway. If "Station24" has incorrect gatekeeper status, TMS will not set up an E164 alias call at all.

If the gateway and "Station24" is not registered on the same gatekeeper, TMS will check neighbour information on the gatekeepers to see if the E164 alias call will go through from the gateway to "Station24".

TMS could have decided to use IP for calls between two TMS locations. Then it had to be configured so that IP was preferred between these two locations. This may be the case between locations with high-quality IP lines between them.

IP-Gateway-ISDN-Gateway-IP Calls.

The second example is almost equal to the first example, but this time the call goes from the IP only videoconference system "Espresso" in the "DallasOffice" TMS location to the IP only "Station24" system in TMS location "LysakerOffice".

Figure 3:
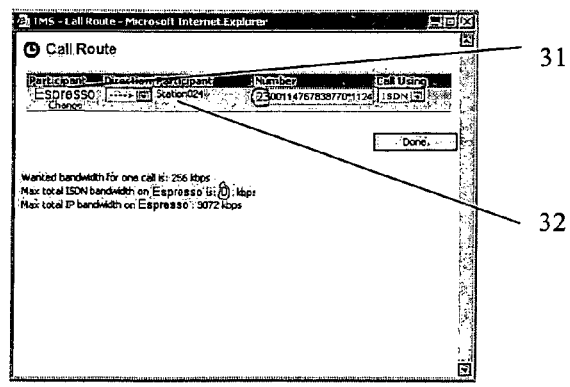
FIG. 3 shows an IP-Gateway-ISDN-Gateway-IP call automatically set up according to the inventive method.

FIG. 3 shows how TMS sets up this call. The call string equals the call string in the first example, except for the "23" prefix, which is the auto bandwidth quality prefix of a gateway located in location "DallasOffice". Participant "Espresso" 31 is located in "DallasOffice", USA. It has no ISDN bandwidth. Participant "Station24" 32 has location "LysakerOffice" (Norway). It has no ISDN bandwidth. There is also a gateway in the "LysakerOffice" location.

TMS decides to involve two gateways in the call rather than calling directly using IP between the two IP-only systems. This is because it then had to rely on the public IP network between Norway and USA, which may give poor quality for the video conference call.

As in the first example, gatekeeper statuses are checked on the gateways and the two videoconference systems to makes sure the call will go through.

Again as in the first example, TMS could have decided to use IP for calls between two TMS locations. It then had to be configured so that IP was preferred between these two locations. This may be the case between locations with high-quality IP lines between them.

The methodology of the gateway routing solution for ISDN calls into a videoconference system with no ISDN capabilities is to identify if there is a gateway on the same location as the videoconference system, or a gateway on a location that is defined to have a good IP line to the videoconference system. The next step is to identify if the gateway will be able to call the videoconference system using an E164 extension number. This is done by using gatekeeper information on the gateway and the videoconference system.

If the gateway and the videoconference system are not using the same gatekeeper, then TMS routing checks if the gatekeeper of the videoconference system is a neighbour of the gatekeeper of the gateway and if an E164 alias call will go through between these two gatekeepers.

If the tests described above are okay, TMS routing will route ISDN calls into the videoconference system with no ISDN capabilities to the gateways ISDN port, then using TSC4 to reach the videoconference system.

For ISDN calls from a system with no ISDN capabilities, all TMS locations can be registered with the auto bandwidth service prefix and the telephone bandwidth prefix of a gateway on the LAN.

TMS routing will use one of these gateway service prefixes to make ISDN calls from videoconference systems with no ISDN capabilities. If an ISDN telephone call is made, the telephone bandwidth service prefix is used. If a videoconference call is made, the auto bandwidth service prefix is used.

Figure 4:
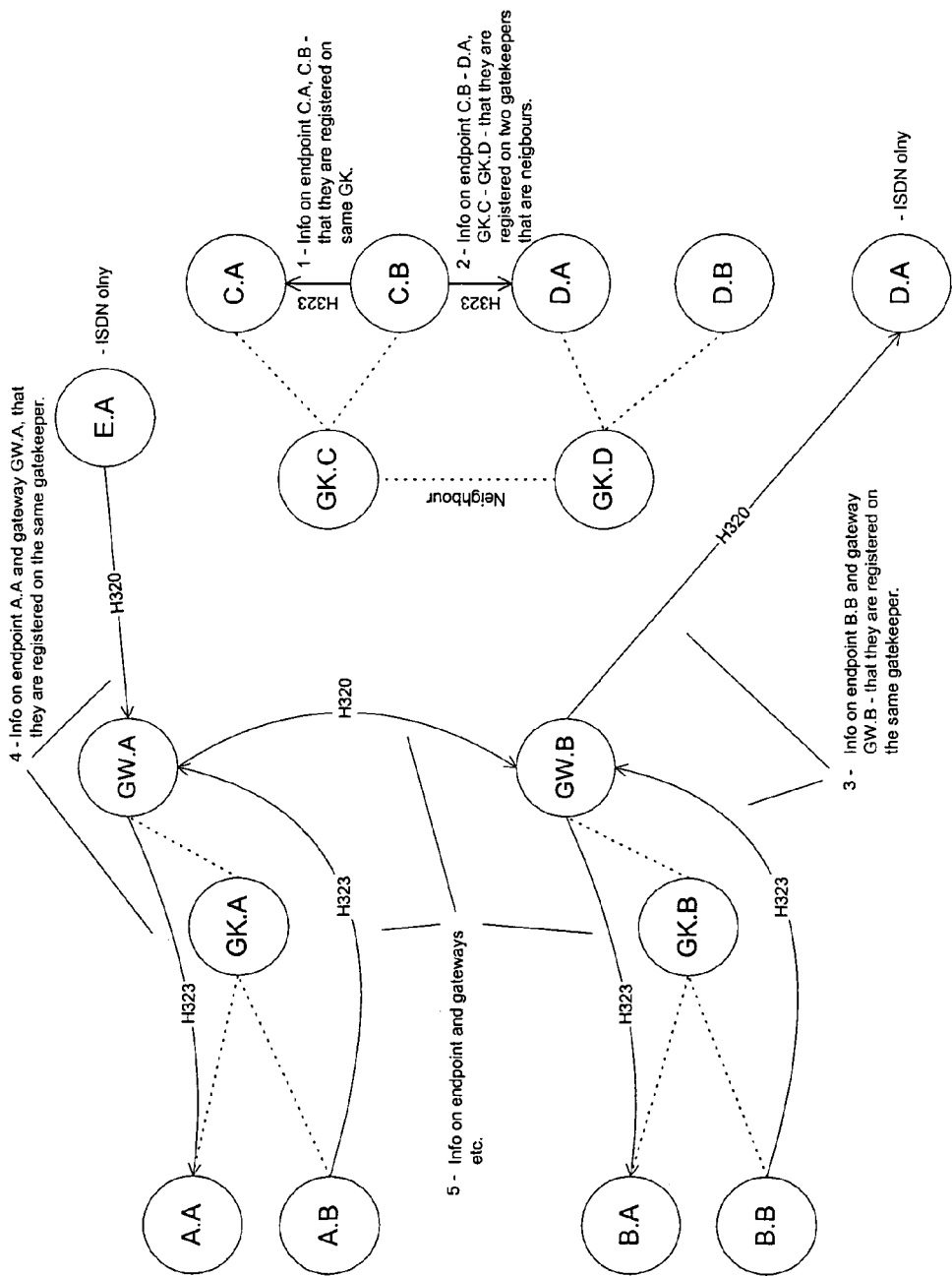
FIG. 4 is a flow chart schematically illustrating the capabilities of the method according to the invention.

FIG. 4 is a flow chart schematically illustrating the capabilities of the method according to the invention.

The figure shows several different systems and ways of connecting them together according to the inventive method described herein.

The systems are defined as:

System A.A: End point, MCU, Gateway connected to Gatekeeper A.
System A.B: End point, MCU, Gateway connected to Gatekeeper A.
Gateway A.G (not shown): Gateway connected to Gatekeeper A.
System B.A: End point, MCU, Gateway connected to Gatekeeper B.
System B.B: End point, MCU, Gateway connected to Gatekeeper B.
Gateway B.G (not shown): Gateway connected to Gatekeeper A (GK.A).
System C.A: End point, MCU, Gateway with ISDN connectivity.

The method will automatically route a call between A.A and A.B using information on A.A and A.B that they are on the same gatekeeper (Gatekeeper A).

The method will automatically route a call between A.A and B.A using information on A.A and B.A and Gatekeeper A and/or Gatekeeper B. E.g. that they are registered to gatekeepers that allow inter-communication (neighbors).

The method will automatically route a call between A.A and C.A using A.G using information on A.A and A.G that they are on the same gatekeeper and that the gateway can make external calls.

The method will automatically route a call between A.A and C.A using B.G using information on A.A and A.G and Gatekeeper A and/or Gatekeeper B that they are registered to gatekeepers that allow inter-communication (neighbours), and that the gateway can make external calls.

The method will automatically route a call between A.A and B.A using A.G and B.G using information on A.A, A.G that they are on the same gatekeeper or gatekeepers that intercommunicate, using information on B.A and B.G that they are on the same gatekeeper or gatekeepers that intercommunicate.

The method will automatically route a call using the above basic methods, given a hierarchy of gatekeepers (e.g. A→B→C→D multiple levels).

The method will automatically route a call using the above basic methods, given a series of gateway (e.g. A→B→C→D multiple networks).

The method can also create the reverse routing of all the above routes.

The method can establish if a route can be made by checking the registration status and/or the actual status of the required elements (end point, MCU, gatekeeper or gateway).

The method can use one or more of the above methods to find the best route least cost, least delay, best bandwidth) together with other possible routes (e.g. ISDN direct, IP-direct, etc.).

The different decisions that are taken in the examples of FIG. 4 are based on the weighting function with the most desirable cost function described earlier.

The invention claimed is:

1. Method for establishing a route between a first and a second conference network device in a conference network, said network comprising a plurality of conference network devices and at least one gatekeeper acting as a central point, providing call control services to registered conference network devices, said method comprising the steps of:
   (a) collecting registration data from a database about said first and the second conference network devices, said database keeping updated information of each conference network device,
   (b) generating a set of possible routes, using said registration data,
   (c) weighting said set of possible routes, based on a set of cost functions,
   (d) selecting one or more routes from said set of possible routes, based on said weighting substep (c).

2. Method according to claim 1, further comprising the steps of:
   presenting said selected route to a user,
   receiving a confirmation from the user, and
   establishing said selected route upon said receipt of said confirmation from the user.

3. Method according to claim 1, wherein each conference network device is selected from the group consisting of an end point, an MCU, and a gateway.

4. Method according to claim 1, wherein said set of possible routes is a reduced set of possible routes through the network, where said routes are reduced based upon a weight function.

5. Method according to claim 1, wherein said generating step (b) includes excluding a route that involves a gateway if a route may be established without the participation of said gateway.

6. Method according to claim 1, wherein said generating step (b) includes excluding a route that involves a gateway if said first and second conference network device are registered on the same gatekeeper.

7. Method according to claim 1, wherein said first and second conference network devices are enabled for IP communication with said conference network, said generating step (b) comprising the substep of including an IP direct route in said reduced set of possible routes.

8. Method according to claim 1, wherein said first and second conference network devices are enabled for ISDN communication with said conference network, said generating step (b) comprising the substep of including an ISDN direct route in said reduced set of possible routes.

9. Method according to claim 1, wherein said network device is enabled for ISDN communication with said conference network and said second network device is enabled for IP communication with said conference network, said generating step (b) comprising the substep of including a route involving a gateway between an ISDN sub-network and an IP sub-network included in said network.

10. Method according to claim 1, wherein said cost functions involves at least one parameter selected from the group consisting of network type parameters, delay parameters, bandwidth parameters, and cost rate parameters.

11. Method according to claim 1, wherein said selecting step (d) comprises selecting the route with the lowest total cost according to said weighing step (c).

12. Method according to one of the claims 1, wherein said conference network comprises a circuit switched sub-network such as an ISDN sub-network and a packet switched sub-network such as an IP sub-network.

13. Method according to one of the claims 1, wherein at least one conference network device is a gateway operatively included in a multipoint control unit.

14. Method according to one of the claims 1, wherein at least one conference network device is multipoint control unit operatively included in an end point.

15. Method according to one of the claims 1, said method being operated by a user interface on a user terminal operatively connected to the network.

16. Method for establishing routes between two or more conference network devices in a conference network, wherein a route between two of the conference network devices is established according to one of the claims 1-11.

17. Device for establishing a route between a first and a second conference network device in a conference network, said network comprising a plurality of conference network devices and at least one gatekeeper acting as a central point, providing call control services to registered conference network devices, said device comprising:
   a registration data providing module for collecting registration data from a database about said first and the second conference network devices, said database keeping updated information of each conference network device;
   a route generating module for generating a set of possible routes, using said registration data;
   a weighting module for weighting said set of possible routes, based on a set of cost functions; and
   a route selecting module for selecting one or more routes from said set of possible routes, based on said weighting of said set of possible routes.

* * * * *